Patented Dec. 21, 1937

2,102,854

UNITED STATES PATENT OFFICE 2,102,854

HALOGEN DERIVATIVES OF N-AMYL CRESOLS

George W. Raiziss and Leroy W. Clemence, Philadelphia, Pa., assignors to Abbott Laboratories, North Chicago, Ill., a corporation of Illinois No Drawing. Application June 22, 1934, Serial No. 731,895

2 Claims. (Cl. 260—154)

Our invention relates to new halogen derivatives of n-amyl cresols, which derivatives we have prepared and have been found by us to possess surprisingly high germicidal values and low toxicities, the germicidal power thereof exceeding the corresponding non-halogen compounds. Our new compounds are of considerable value to the medical profession as bactericidal and bacteriostatic agents.

The compounds described below, all of which we have prepared, include monochloro, dichloro, monobromo, and dibromo derivatives of the n-amyl-o-, m-, and p-cresols. The unhalogenated alkyl cresols herein referred to may be prepared as described in our co-pending application, Serial No. 731,898, filed June 22, 1934.

Briefly, this method comprises heating the particular alcohol with zinc chloride to the specific reaction temperature and then slowly adding the desired cresol; maintaining the reaction temperature until the reaction is complete and then pouring the mixture into acidified water. The alkylated cresol which separates is washed with water and extracted with alkali, the alkaline extract in turn being extracted with petroleum ether. The alkyl cresol is separated from its alkaline solution by acidifying with HCl, the desired product being again washed and distilled in vacuo.

Example 1

*Monochloro-n-amyl-ortho cresol*

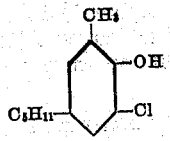

27 grams of sulfuryl chloride are added slowly to 36 grams of n-amyl-ortho-cresol in a flask fitted with a dropping funnel and reflux condenser. Warming on a water bath is sometimes necessary to start the reaction. After the addition of the chloride is complete and there is no further evolution of hydrogen chloride or sulfur dioxide, we warm on water bath for several hours to drive off the last traces of HCl and $SO_2$. The mixture is then added to 200 cc. of water. The oily layer which separates is dissolved in 400 cc. of normal sodium hydroxide solution, the insoluble material extracted with petroleum ether, and the clear alkaline solution acidified with hydrochloric acid. The oil which separates is washed with water and taken up in ether. The ether solution is dried over sodium sulphate, filtered, the ether distilled off, and the residue distilled under vacuum.

The monochloro-n-amyl-ortho cresol boils at 147–155° C. at 12 mm. pressure and has a specific gravity of 1.059.

Example 2

*Monochloro-n-amyl-meta-cresol*

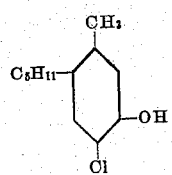

This compound is prepared in exactly the same manner as the previous compound, substituting n-amyl-meta cresol for the ortho derivative. This compound boils at 142–151° C. at 8 mm. pressure and has a specific gravity of 1.069.

Example 3

*Monochloro-n-amyl-para-cresol*

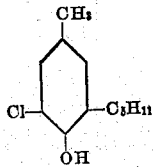

This compound is also prepared as in Example 1, substituting n-amyl-para-cresol for the ortho compound. This product has a boiling point of 140–147° C. at 10 mm. pressure and has a specific gravity of 1.050.

The monochloro derivatives are all colorless oils, soluble in organic solvents and dilute alkali, insoluble in water.

Example 4

*Dichloro-n-amyl-ortho-cresol*

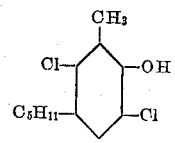

This compound is prepared by the method of Example 1 except that 58 grams of sulfuryl chloride are used. The product boils at 160–165° C. at 12 mm. pressure and has a specific gravity of 1.142. It is a yellow oil, insoluble in water, soluble in dilute alkali and organic solvents.

Example 5

*Dichloro-n-amyl-meta-cresol*

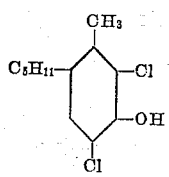

This compound is prepared the same as in Example 4 except for the substitution of n-amyl-meta cresol. It has a boiling point of 159–168° C. at 10 mm. pressure and has a specific gravity of 1.160. It is an amber colored oil, insoluble in water, soluble in organic solvents and dilute alkali.

Example 6

*Dichloro-n-amyl-para-cresol*

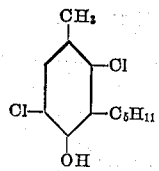

This compound is prepared as in Example 4, substituting n-amyl-para-cresol. It has a boiling point of 140–150° C. at 10 mm. pressure and has a specific gravity of 1.244. It is an amber colored oil, insoluble in water, soluble in dilute alkali and organic solvents.

Example 7

*Monobromo-n-amyl-ortho-cresol*

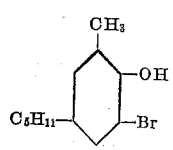

18 grams of n-amyl-ortho-cresol are dissolved in 50 cc. of chloroform in a flask fitted with a dropping funnel and a reflux condenser. To this is added a little iron powder and then through the funnel is gradually added 16 grams of bromine dissolved in 20 cc. of chloroform. It may be necessary to warm the mixture on a water bath to start the reaction. After all the bromine solution is added, the mixture is warmed for one hour. The mixture is then poured into 200 cc. water and the chloroform layer washed with water. We then separate and distill off the chloroform. The residue is dissolved in 200 cc. of normal sodium hydroxide solution and the insoluble portion extracted with petroleum ether.

The clear alkaline portion is acidified and the separated oil is extracted with ether. The ether solution is dried over sodium sulfate and filtered; the ether is distilled off and the residue distilled under vacuum. It boils at 160–163° C. at 12 mm. pressure and has a specific gravity of 1.292. It is a straw colored oil, soluble in organic solvents and dilute alkali, insoluble in water.

Example 8

*Monobromo-n-amyl-meta-cresol*

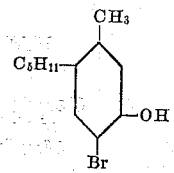

This compound is prepared as in the previous example, substituting n-amyl-meta-cresol. It has a boiling point of 155–163° C. at 10 mm. pressure and has a specific gravity of 1.268. It is a colorless oil, insoluble in water, soluble in dilute alkali and organic solvents.

Example 9

*Monobromo-n-amyl-para-cresol*

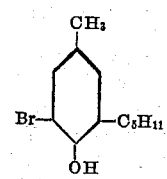

This compound is prepared as in Example 7, substituting n-amyl-para-cresol. It boils at 146–150° C. at 10 mm. pressure and has a specific gravity of 1.244.

Example 10

*Dibromo-n-amyl-ortho-cresol*

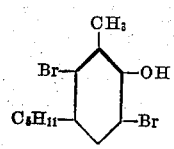

The dibromo compounds are prepared by the method of Examples 7–9 except that the quantity of bromine is 38 grams and the quantity of solvent therefor is proportionately increased.

The above product has a boiling point of 175–180° C. at 20 mm. pressure and has a specific gravity of 1.519.

Example 11

*Dibromo-n-amyl-meta-cresol*

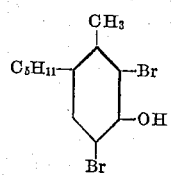

This compound boils at 186–188° C. at 10 mm.

pressure and has a specific gravity of 1.603. It is an amber colored oil, soluble in organic solvents and dilute alkali, insoluble in water.

EXAMPLE 12

*Dibromo-n-amyl-para-cresol*

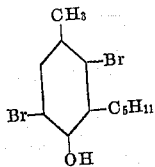

This compound boils at 175–185° C. at 10 mm. pressure and has a specific gravity of 1.577. It is an orange-yellow oil, insoluble in water, soluble in dilute alkali and organic solvents.

Other halogen derivatives as, for example, iodine compounds of the n-amyl cresols may be similarly prepared and have analogous properties.

The physical properties of the compounds specified above are summarized as follows:

| Compound | B. P. | Press | Sp. gr. |
|---|---|---|---|
| | *Degrees* | *Millimeters* | |
| Monochloro-n-amyl-ortho-cresol | 147–155 | 12 | 1.059 |
| Monochloro-n-amyl-meta-cresol | 142–151 | 8 | 1.069 |
| Monochloro-n-amyl-para-cresol | 140–147 | 10 | 1.050 |
| Dichloro-n-amyl-ortho-cresol | 160–165 | 12 | 1.142 |
| Dichloro-n-amyl-meta-cresol | 159–168 | 10 | 1.160 |
| Dichloro-n-amyl-para-cresol | 140–150 | 10 | 1.244 |
| Monobromo-n-amyl-ortho-cresol | 160–163 | 12 | 1.292 |
| Monobromo-n-amyl-meta-cresol | 155–163 | 10 | 1.268 |
| Monobromo-n-amyl-para-cresol | 146–150 | 10 | 1.244 |
| Dibromo-n-amyl-ortho-cresol | 175–180 | 20 | 1.519 |
| Dibromo-n-amyl-meta-cresol | 186–188 | 10 | 1.603 |
| Dibromo-n-amyl-para-cresol | 175–185 | 10 | 1.577 |

We claim as our invention:
1. A n-amyl cresol which is dihalogenated on the ring.
2. A ring-halogenated aromatic compound, namely, dichloro-n-amyl-meta cresol.

GEORGE W. RAIZISS.
LE ROY W. CLEMENCE.